United States Patent
Ben-Shtirit et al.

(10) Patent No.: US 12,333,740 B1
(45) Date of Patent: Jun. 17, 2025

(54) DETERMINING A LOCATION OF A SHOPPING CONTAINER WITHIN A STORE

(71) Applicant: Shopic Technologies LTD., Tel Aviv (IL)

(72) Inventors: Evyatar Nimrod Ben-Shtirit, Tel Aviv (IL); Shlomi Amitai, Tel Aviv (IL); Eran Menahem Kravitz, Tel Aviv (IL); Lia Eidler-Shemesh, Tel Aviv (IL); Raz Aharon Golan, Tel Aviv (IL)

(73) Assignee: Shopic Technologies LTD., Tel Aviv (IL)

( * ) Notice: Subject to any disclaimer, the term of this patent is extended or adjusted under 35 U.S.C. 154(b) by 0 days.

(21) Appl. No.: 18/793,704

(22) Filed: Aug. 2, 2024

(51) Int. Cl.
*H04N 23/90* (2023.01)
*G06T 7/246* (2017.01)
*G06T 7/73* (2017.01)

(52) U.S. Cl.
CPC .............. *G06T 7/248* (2017.01); *G06T 7/74* (2017.01); *H04N 23/90* (2023.01); *G06T 2207/20081* (2013.01); *G06T 2207/20084* (2013.01); *G06T 2207/30244* (2013.01)

(58) Field of Classification Search
CPC .......... G06F 3/011; G06F 3/017; G06F 3/013; G06F 3/0304; G06F 18/22; G06F 3/04883; G06F 3/04842; G06F 3/04845; G06F 3/04815; G06F 3/0487; G06Q 30/06; G06Q 30/0633; G06Q 30/0603; G06Q 30/0601; G06Q 20/12; G06Q 20/02; G06Q 20/04; G06Q 20/10; G06Q 30/0641
USPC ........................................................ 348/159
See application file for complete search history.

(56) References Cited

U.S. PATENT DOCUMENTS

| | | | | |
|---|---|---|---|---|
| 2020/0364898 | A1* | 11/2020 | Lawlor | G06T 7/74 |
| 2021/0158430 | A1* | 5/2021 | Buibas | H04B 3/02 |
| 2021/0253152 | A1* | 8/2021 | Hirama | G06F 3/04886 |
| 2024/0281817 | A1* | 8/2024 | Sanzari | G06V 20/52 |

* cited by examiner

*Primary Examiner* — Masum Billah
(74) *Attorney, Agent, or Firm* — Reches Patents

(57) ABSTRACT

There is provided a method for determining a location of a shopping container within a store, the method includes (i) acquiring by a first side camera associated with the shopping container, a side first side image of first content located to a first side of the shopping container; (ii) determining a pose of the first side camera, based on the first side image and by a machine learning process trained using a structure from motion model of the store, wherein the structure from motion model is generated from untagged side images acquired by side cameras of shopping containers that moved within the store during an image acquisition process, wherein the untagged side images are associated with side cameras pose information learnt during the generation of the structure from motion model; and (iii) determining the location of the shopping container based on the pose of the first camera.

23 Claims, 10 Drawing Sheets

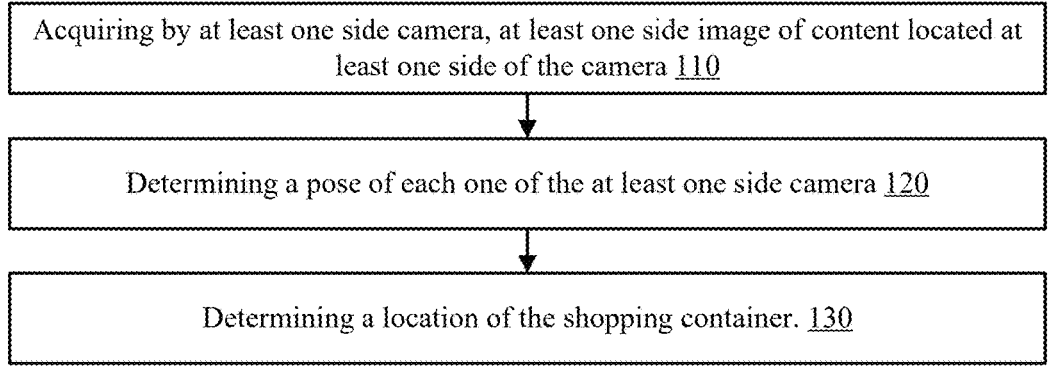
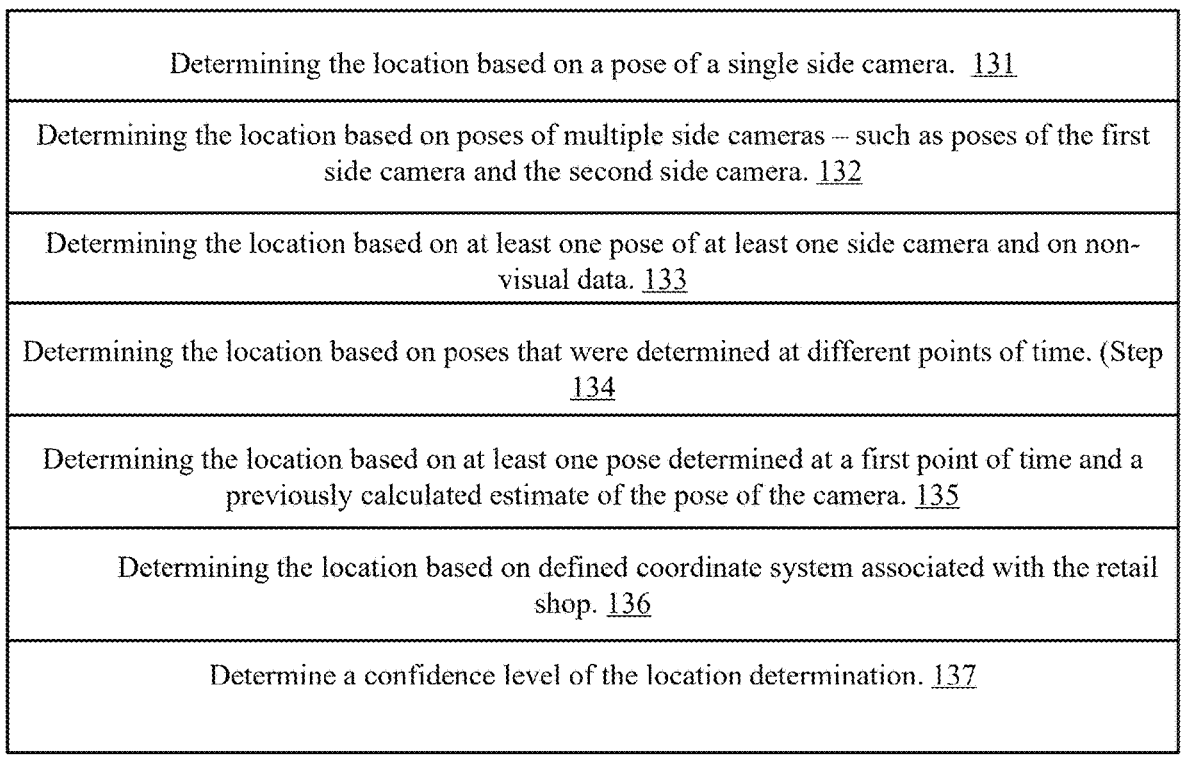
100
FIG. 1

| |
|---|
| Accepting the location estimation when the confidence level exceeds a confidence level threshold. 141 |
| Rejecting the location estimation when the confidence level is below a confidence level threshold. 142 |
| Performing another location estimations session following the rejection of the location estimation. 143 |
| Generating a location error alert following the rejection of the location estimation. 144 |
| Using the location estimate as an anchor to a simultaneous localization and mapping process (SLAM) 145 |
| Identifying excessive locations errors -- location errors within a region of the store that are abnormal or above a location error threshold. 146 |
| Evaluating a cause of the excessive locations errors. 147 |
| Estimating that the excessive locations errors result from a change in the content of the region. 148 |
| Responding to the estimating that the excessive locations errors result from a change in the content of the region. 149 |

| |
|---|
| Generating a content change alert. 151 |
| Triggering or requesting or instructing to update the structure from motion model based on the location estimate errors associated with the region of the structure from motion model. 152 |
| Ignoring location estimates generated from the region -- and if the location errors are associated with one side of the shopping container -- ignoring location estimates from that side. 153 |
| Ignoring location estimates generated from the region -- and if the location errors are associated with one side of the shopping container - accepting location estimates from the other side. 154 |
| Lowing the confidence level assigned to the location estimates within the region. 155 |
| Generating a human perceivable request to change the movement of the shopping container within the region so that at least one side camera will capture images, within the region, of another side of the region. 156 |
| Generating a request aimed to another computerize device -- such as the mobile phone of a user that uses the shopping container to perform a movement of the shopping container within the region so that at least one side camera will capture images, within the region, of another side of the region. 157 |
| Generating a request aimed to another computerize device -- such as to a portable computerized device associated with another shopping cart or to a computerized system in communication with other portable computerized devices to perform a movement of another shopping container within the region. 158 |
| Request a transmission of one or more side images acquired within the region to another computerize device for further analysis of the content of the region. 159 |
| Perform a content analysis, by a portable computerized device associated with the shopping container, of the content of the region. 160 |
| Responding to the content analysis -- for example generating a region content change alert. 161 |

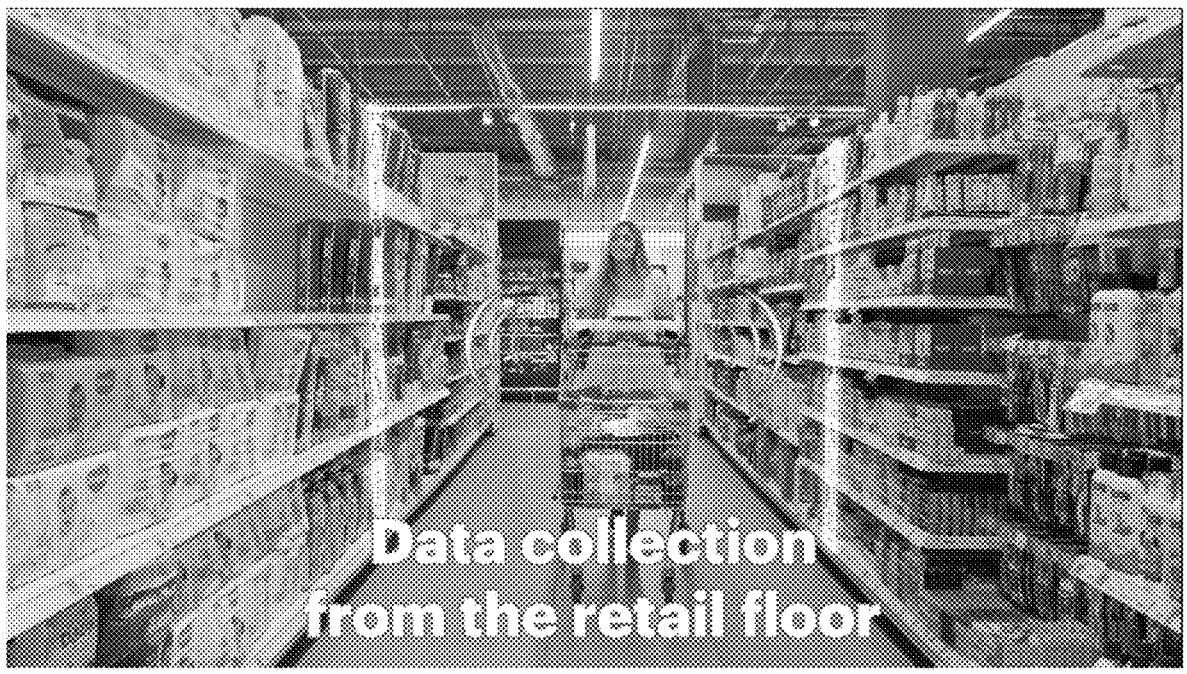
901
902
903
FIG. 9

DETERMINING A LOCATION OF A SHOPPING CONTAINER WITHIN A STORE

BACKGROUND OF THE INVENTION

Shopping carts are essential tools for customers in retail environments, allowing them to collect and transport items as they shop. Locating these carts within a store can be challenging, especially in large or crowded spaces. Traditional methods for tracking the position of shopping carts often involve the installation of specialized hardware, such as beacons, which can be costly and require regular maintenance.

Additionally or alternatively, these methods may require significant computational resources and complex machine learning algorithms that need extensive supervised training, further increasing the time and financial investment needed for implementation.

SUMMARY

There are provided methods, non-transitory computer readable media and computerized systems as illustrated in the specification.

BRIEF DESCRIPTION OF THE DRAWINGS

The subject matter that is regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawing in which:

FIG. 1 illustrates an example of a method;

FIG. 2 illustrates an example of a step of the method of FIG. 1;

FIG. 3 illustrates an example of a step of the method of FIG. 1;

FIG. 9 illustrates examples of images; and

DETAILED DESCRIPTION OF THE DRAWINGS

Figure 4:
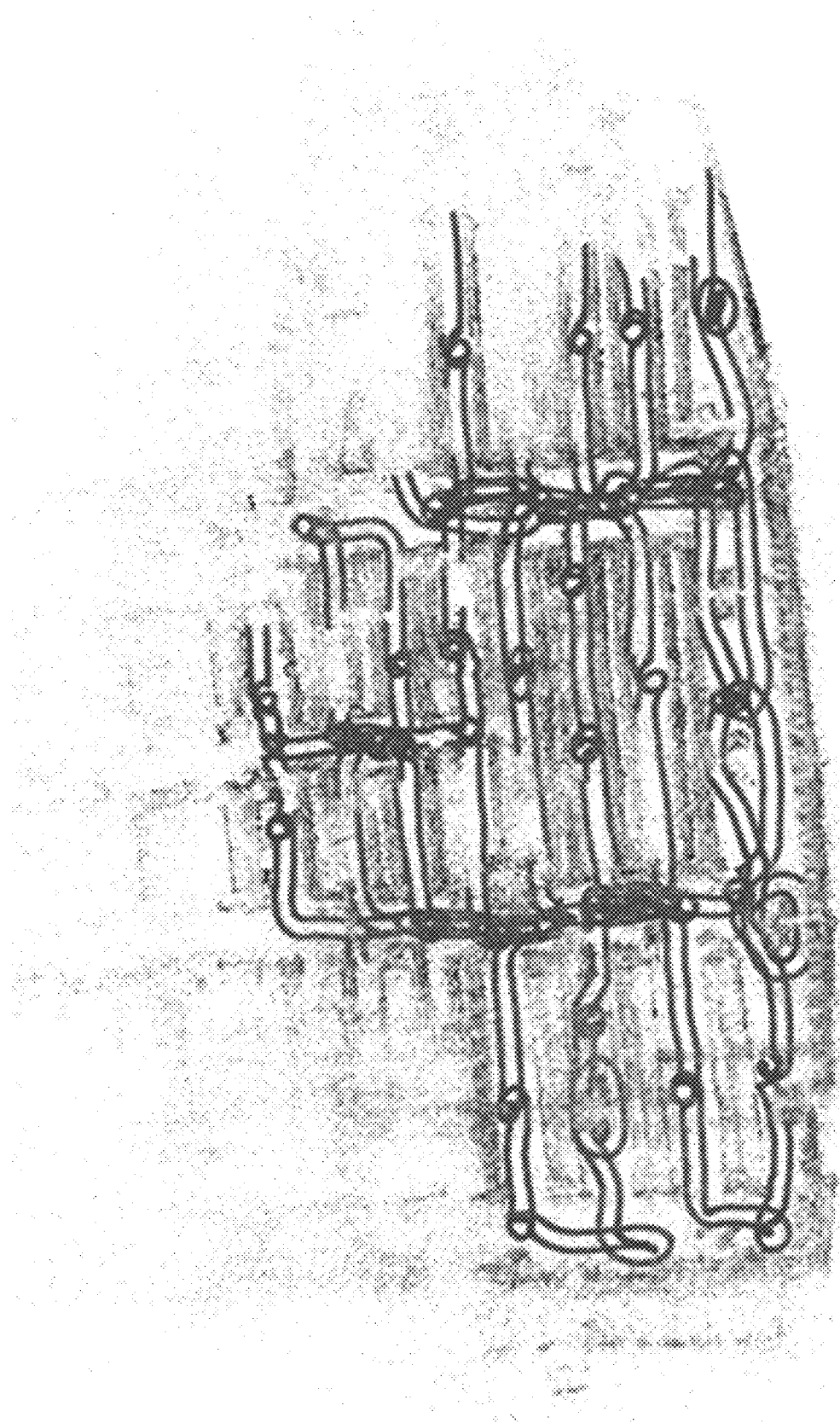
FIG. 4 illustrates an example of a structure from motion model.

FIG. 1 illustrates an example of method 100 for locating a shopping container.

According to an embodiment, method 100 includes steps 110, 120 and 140.

Step 110 includes acquiring by at least one side camera, at least one side image of content located at least one side of the camera.

Shops includes lanes formed between shelves and users usually move along the lanes. Using a side images is more beneficial for location determination than front cameras—especially when not having dedicated distance location elements such as LIDARs.

According to an embodiment, the at least one side camera is a first side camera associated with the shopping container, and configured to acquire a first side image of first content located to a first side of the shopping container. Acquiring a side first side image of first content located to a first side of the shopping container by a first side camera is to determine the location of the shopping container within the store. This is for the real-time and high accuracy location of shopping containers within an indoor store environment.

The first side camera captures the side first side image to facilitate the determination of the shopping container's location.

The shopping container, which can be a shopping cart, is equipped with this first side camera to enable this process. The first side camera's acquisition of the side first side image is for the subsequent steps in the method. The captured image provides the data for determining the pose of the first side camera.

A pose of a camera represents the location and the orientation of the camera.

This pose determination is based on the first side image and is performed by a machine learning process trained using a structure from motion model of the store.

The structure from motion model is generated from untagged side images acquired by side cameras of shopping containers that moved within the store during an image acquisition process.

Using the untagged side images greatly simplifies and reduces the cost of the generation of a dataset used to training the machine learning process. The acquisition of the untagged images does not require using trained personnel—rather asking layman to move within the store—which also greatly simplifies the process and reduces the cost associated with the process.

These untagged side images are associated with side cameras pose information learned during the generation of the structure from motion model.

The structure from motion model is generated from untagged side images acquired by side cameras of shopping containers that moved within the store during an image acquisition process. The structure from motion model is used to train the machine learning process for determining the pose of the cameras and ultimately the shopping container's location.

The machine learning process, which is trained using this structure from motion model, plays a role in determining the pose of the first side camera. Determining the pose of the first side camera based on the first side image and by a machine learning process trained using a structure from motion model of the store is to facilitate the determination of the shopping container's location. This process ensures that the location determination is accurate and reliable, leveraging the data from the first side image and the trained machine learning model. The goal of these actions is to determine the location of the shopping container based on the pose of the first camera. This allows for the precise location of the shopping container within the store. Determining the location of the shopping container is to enable the real-time and high accuracy location of shopping containers within an indoor store environment.

This method does not require extra hardware such as location transmitting beacons or other locating assisting hardware elements that have to be installed within the indoor store and require maintenance. The solution is designed to be efficient in human resources and time consumption, easy to scale, and able to adapt to ongoing changes in the store.

It also does not require time-consuming supervised training of a machine learning process, making it practical for real-world applications.

According to an embodiment, the at least one side camera includes the first side camera and a second side camera that is adapted to acquire a second side image of second content located to a second side of the shopping container.

The second side differs from the first side. The second side may be opposite to the first side or may be oriented by any angle. It has been found that the using multiple side cameras is more beneficial when the fields of view of the first side camera and the second side camera do not overlap. Partial overlap may be more beneficial than a full overlap.

Acquiring a side second side image of second content located to a second side of the shopping container by a second side camera is also used to determine the location of the shopping container within the store. This is for the real-time and high accuracy location of shopping containers within an indoor store environment.

The second side camera captures the side second side image to facilitate the determination of the shopping container's location.

According to an embodiment, using location estimates from more than a single side camera increases the location determination accuracy.

In step 120, the process involves determining a pose of each one of the at least one side camera.

According to an embodiment, the pose of the first side camera is determined based on the first side image and by a machine learning process trained using a structure from motion model of the store.

According to an embodiment, the pose of the first side camera is determined based on the first side image and by the machine learning process trained using a structure from motion model of the store. In addition, the pose of the second side camera is determined based on the second side image and by the machine learning process trained using a structure from motion model of the store.

In summary, step 120 involves a detailed and multifaceted approach to determining the pose of the at least one side camera using the machine learning process trained with the structure from motion model.

According to an embodiment, step 120 is followed by step 130 of determining a location of the shopping container. Any other response to the outcome of step 120 may be provided.

According to an embodiment, step 130 includes determining a location of the shopping container.

According to an embodiment, step 130 includes at least one of:
  a. Determining the location based on a pose of a single side camera. (Step 131).
  b. Determining the location based on poses of multiple side cameras—such as poses of the first side camera and the second side camera. (Step 132).
  c. Determining the location based on at least one pose of at least one side camera and on non-visual data. (Step 133).
  d. Determining the location based on poses that were determined at different points of time. (Step 134).
  e. Determining the location based on at least one pose determined at a first point of time and a previously calculated estimate of the pose of the camera. (Step 135).
  f. Determining the location based on defined coordinate system associated with the retail shop. (Step 136).
  g. Determine a confidence level of the location determination. (Step 137).

According to an embodiment, step 130 is followed by step 140 of responding to the location estimate.

According to an embodiment, step 140 includes at least one of the following steps—as illustrated in FIG. 2:
  a. Accepting the location estimation when the confidence level exceeds a confidence level threshold. (Step 141). The confidence level threshold may be determine in any manner and may have any value—for example by a, manufacturer of the device, by a shop owner, based on the required location accuracy—for example based on spacings between shelves, and the like.
  b. Rejecting the location estimation when the confidence level is below a confidence level threshold. (Step 142).
  c. Performing another location estimations session following the rejection of the location estimation. (Step 143).
  d. Generating a location error alert following the rejection of the location estimation. (Step 144).
  e. Using the location estimate as an anchor to a simultaneous localization and mapping process (SLAM). (Step 145).
  f. Identifying excessive locations errors-location errors within a region of the store that are abnormal or above a location error threshold. (Step 146).
  g. Evaluating a cause of the excessive locations errors. (Step 147).
  h. Estimating that the excessive locations errors result from a change in the content of the region. (Step 148).
  i. Responding to the estimating that the excessive locations errors result from a change in the content of the region. (Step 149).

According to an embodiment, step 150 of responding to the estimating that the excessive locations errors may include at least one of the following steps—as illustrated in FIG. 2:
  i. Generating a content change alert. (Step 151).
  ii. Triggering or requesting or instructing to update the structure from motion model based on the location estimate errors associated with the region of the structure from motion model. (Step 152).
  iii. Ignoring location estimates generated from the region—and if the location errors are associated with one side of the shopping container—ignoring location estimates from that side. (Step 153).
  iv. Ignoring location estimates generated from the region—and if the location errors are associated with one side of the shopping container—accepting location estimates from the other side. (Step 154).
  v. Lowing the confidence level assigned to the location estimates within the region. (Step 155).
  vi. Generating a human perceivable request to change the movement of the shopping container within the region so that at least one side camera will capture images, within the region, of another side of the region. For example—moving the shopping container in the opposite direction. (Step 156).
  vii. Generating a request aimed to another computerize device—such as the mobile phone of a user that uses the shopping container to perform a movement of the shopping container within the region so that at least one side camera will capture images, within the region, of another side of the region. For example—moving in the opposite direction. (Step 157).
  viii. Generating a request aimed to another computerize device—such as to a portable computerized device associated with another shopping cart or to a computerized system in communication with other portable computerized devices to perform a movement of another shopping container within the region. (Step 158).

ix. Request a transmission of one or more side images acquired within the region to another computerize device for further analysis of the content of the region. (Step 159).

x. Perform a content analysis, by a portable computerized device associated with the shopping container, of the content of the region. (Step 160).

xi. Responding to the content analysis—for example generating a region content change alert. (Step 161).

The triggering of an update of the structure from motion model is to maintain or improve the accuracy of the model. This is done based on location estimate errors associated with a region of the structure from motion model. Triggering an update of the structure from motion model based on location estimate errors refines and improves the model even when the region is changed. This ensures that the location process can adapt to on-going changes in the store, making it easy to scale.

Figure 5:
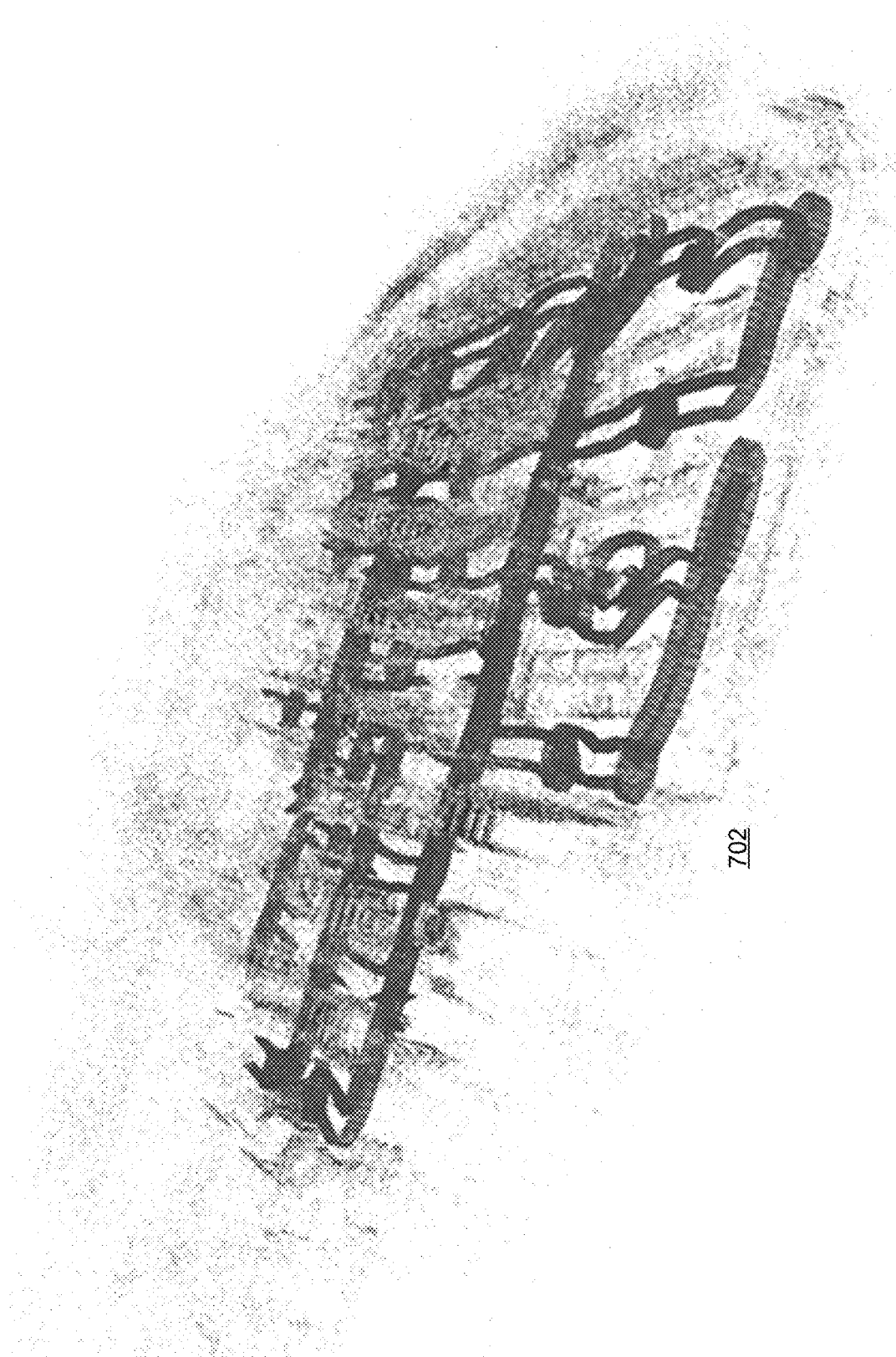
FIG. 5 illustrates an example of a structure from motion model.

In an example:

a. The structure from motion model was COLMAP, introduced in "Structure-from-Motion Revisited" by Johannes L. Schonberger and Jan-Michael Frahm, which is incorporated herein by reference. FIGS. 4 and 5 illustrate examples of portions 701, 702 and 703 of a COLMAP in which the shelfs are illustrated by dots and the pathways within the store are illustrated by lines.

b. The pose was represented by a cartesian location coordinates (for example, X, Y and Z) and quaternion orientation coordinates (QW, QX, QY, QZ)—although other coordinate systems may be used. In an example, the quaternion is defined using the Hamilton convention, which is, for example, also used by the Eigen library.

c. The coordinates of the projection/camera center are given by $-R^\wedge t \ast T$, where $R^\wedge t$ is the inverse/transpose of the 3×3 rotation matrix composed from the quaternion and T is the translation vector. The local camera coordinate system of an image is defined in a way that the X axis points to the right, the Y axis to the bottom, and the Z axis to the front as seen from the image.

d. The determination of the location of the portable computerized device included determining the world coordinates of the image coordinates. This included:

i. Defining a coordinate system to the store.

ii. For all images using a quaternion (QW, QX, QY, QZ) and a translation vector of the sparse 3D reconstructed model, calculate the Rotation, Translation and Sclae parameters in camera coordinate system (image projection to camera).

iii. For all images use the calculated parameters (rotation, translation and scale) together with camera intrinsic parameters to compute the world coordinates of each image of the sparse 3D reconstructed model.

iv. Using a few images of the model finding the calculated world location, find their location in the desired store coordinate system.

v. Find the transformation (rotation, translation and scale) between the calculated world coordinate system and the store coordinate system.

vi. Use a word to store translation, rotation and scale and convert all images to store coordinate system.

e. The machine learning process is implemented using a deep neural network designed for absolute pose regression. The deep neural network has a backbone of GoogLeNet, one or more heads of regression and using a loss function responsive to a location mean square error and to an orientation mean square loss.

It should be noted that other neural networks may be used, that other loss function can be applied, and the like.

Figure 6:
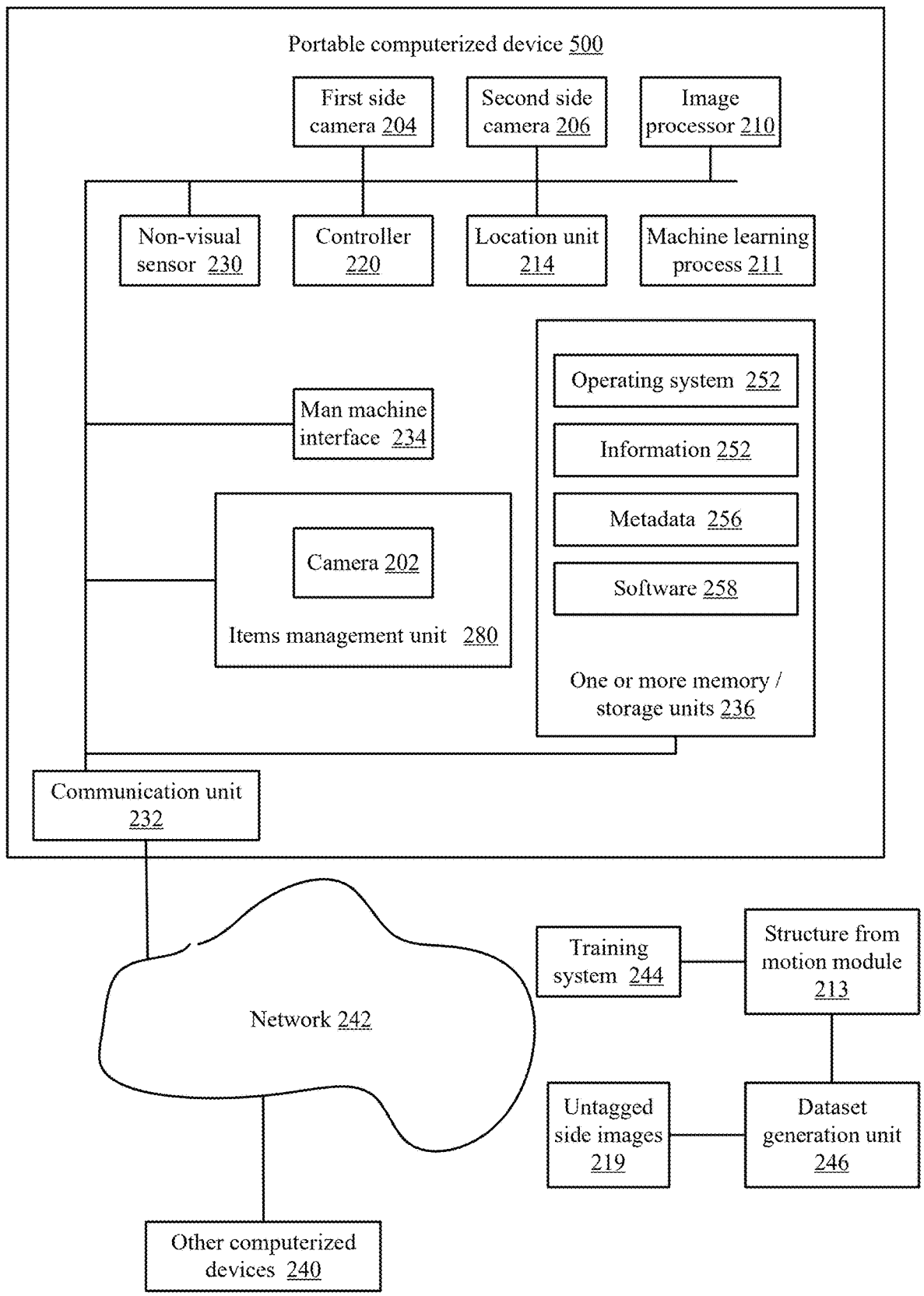
FIG. 6 illustrates an example of a portable computerized device.

FIG. 6 is a block diagram of a portable computerized device 200 configured for tracking items in a shopping container, its environment, as well as training system, 244 for training the machine learning process, dataset generation unit 246 configured to generate the structure from motion module 213 from at least untagged side images 219.

According to an embodiment, the portable computerized device 200 includes:

a. A camera 202 configured to capture one or more images of an item being inserted to or removed from the shopping container.

b. A first side camera 204 configured to acquire a side first side image of first content located to a first side of the shopping container.

c. An image processor 210 configured to determine a pose of the first side camera, based on the first side image and by a machine learning process trained using a structure from motion model of the store, wherein the structure from motion model is generated from untagged side images acquired by side cameras of shopping containers that moved within the store during an image acquisition process, wherein the untagged side images are associated with side cameras pose information learnt during the generation of the structure from motion model. According to an embodiment the image processor is a dedicated machine learning processor—or includes machine learning processing capabilities and one or more other capabilities. The machine learning process is denoted 211.

d. A location unit 214 configured to determine the location of the shopping container based on the pose of the first camera.

e. A controller 220 for controlling components of the shopping container.

f. A non-visual sensor 230 configured to provide non-visual information regarding the location of the shopping container.

g. Communication unit 232 configured to communicate with other computerized devices 240 over network 242. The other computerized devices may be one or more mobile devices of one or more users, one or more other portable computerized devices associated with one or more shipping containers, a computerized system (such as central computerized system) in communication with other portable computerized devices.

h. Man machine interface 234 configured to communicate with a user of the shopping container.

i. One or more memory/storage units 236.

According to an embodiment, the portable computerized device include fewer or more components than those illustrated in (a)-(i)—for example, the portable computerized device may not include the non-visual sensor and/or the other camera and/or the second side camera, and the like.

According to an embodiment, the portable computerized device 300 includes a items management unit 280 configured to monitor the insertion of items into the shopping container, monitor the removal of items from the shopping container and perform any other operation related to the payment for items. Some of the components of the items management unit 230 are included in the portable computerized device illustrated in US patent application 2023/048635 titled "System and method for fast checkout using a detachable computerized device" which is incorporated herein by reference. Some of these components are illustrated in FIG. 2 of US patent application 2023/048635 and include an object detection module, a classification module, a machine learning chip, a shopping management module, a scanner, cameras, and the like. According to an embodiment, at least some of the components are also usable for implementing other tasks—for example assisting in the determining of the location of the shopping container.

According to an embodiment, the items management unit 280 includes camera 202 (or one or more cameras) for tracking items being inserted or removed from the shopping container.

The image processor and the location unit may be different hardware components, may be different software components or may share at least one software or hardware resource. The image processor and the location unit may include one or more processing circuits. A processing circuit includes one or more integrated circuits or may belong to an integrated circuit. A processing circuit may be a general purpose processing circuit, a specialized processing circuit such as a machine learning integrated circuit, a graphic unit processor, and the like.

According to an embodiment, the portable computerized device also includes one or more additional side cameras such as second side camera 206 that is configured to acquire a second side image of second content located to a second side of the portable computerized device.

The second side differs from the first side. The second side may be opposite to the first side or may be oriented by any angle. It has been found that the using multiple side cameras is more beneficial when the fields of view of the first side camera and the second side camera do not overlap. Partial overlap may be more beneficial than a full overlap.

According to an embodiment, the image processor 210 is configured to determine the pose of the second camera, based on the second side image and by the machine learning process.

According to an embodiment, the location unit 214 is configured to determine the location of the portable computerized device also based on the pose of the second camera.

According to an embodiment, using location estimates from more than a single side camera increases the location determination accuracy.

This pose determination is based on one or more side images and is performed by a machine learning process trained using a structure from motion model of the store.

The structure from motion model is generated from untagged side images acquired by side cameras of shopping containers that moved within the store during an image acquisition process.

These untagged side images are associated with side cameras pose information learned during the generation of the structure from motion model.

The structure from motion model is generated from untagged side images acquired by side cameras of shopping containers that moved within the store during an image acquisition process. The structure from motion model is used to train the machine learning process for determining the pose of the cameras and ultimately the shopping container's location.

The machine learning process, which is trained using this structure from motion model, plays a role in determining the pose of the first side camera. Determining the pose of the first side camera based on the first side image and by a machine learning process trained using a structure from motion model of the store is to facilitate the determination of the shopping container's location. This process ensures that the location determination is accurate and reliable, leveraging the data from the first side image and the trained machine learning model. The goal of these actions is to determine the location of the shopping container based on the pose of the first camera. This allows for the precise location of the shopping container within the store. Determining the location of the shopping container is to enable the real-time and high accuracy location of shopping containers within an indoor store environment.

This portable computerized system is configured to determine the location of the shopping container without requiring extra hardware such as location transmitting beacons or other locating assisting hardware elements that have to be installed within the indoor store and require maintenance. The solution is designed to be efficient in human resources and time consumption, easy to scale, and able to adapt to ongoing changes in the store. It also does not require time-consuming supervised training of a machine learning process, making it practical for real-world applications.

According to an embodiment, the machine learning process was trained using a loss function applied on location estimates provided based on first side images and on location estimated based on second side images.

According to an embodiment, the machine learning process was trained using a loss function applied on location estimates provided based on first side images and not on second side images—and vice verse.

According to an embodiment, the portable computerized device the location 214 is configured to perform at least one step of the following steps:
  a. Determining the location based on a pose of a single side camera.
  b. Determining the location based on poses of multiple side cameras—such as poses of the first side camera and the second side camera.
  c. Determining the location based on at least one pose of at least one side camera and on non-visual data.
  d. Determining the location based on poses that were determined at different points of time.
  e. Determining the location based on at least one pose determined at a first point of time and a previously calculated estimate of the pose of the camera.
  f. Determining the location based on defined coordinate system associated with the retail shop.
  g. Determine a confidence level of the location determination.

According to an embodiment, the portable computerized system is also configured to respond to the location estimate by performing at least one of the following steps:
  a. Accepting the location estimation when the confidence level exceeds a confidence level threshold.
  b. Rejecting the location estimation when the confidence level is below a confidence level threshold.
  c. Performing another location estimations session following the rejection of the location estimation.
  d. Generating a location error alert following the rejection of the location estimation.
  e. Using the location estimate as an anchor to a simultaneous localization and mapping process (SLAM).
  f. Identifying excessive locations errors-location errors within a region of the store that are abnormal or above a location error threshold.

g. Evaluating a cause of the excessive locations errors.

h. Estimating that the excessive locations errors result from a change in the content of the region.

i. Responding to the estimating that the excessive locations errors result from a change in the content of the region.

According to an embodiment, portable computerized system is also configured to respond to the estimating that the excessive locations errors by performing at least one of the following steps:

i. Generating a content change alert.

ii. Triggering or requesting or instructing to update the structure from motion model based on the location estimate errors associated with the region of the structure from motion model.

iii. Ignoring location estimates generated from the region—and if the location errors are associated with one side of the shopping container—ignoring location estimates from that side.

iv. Ignoring location estimates generated from the region—and if the location errors are associated with one side of the shopping container—accepting location estimates from the other side.

v. Lowering the confidence level assigned to the location estimates within the region.

vi. Generating a human perceivable request to change the movement of the shopping container within the region so that at least one side camera will capture images, within the region, of another side of the region. For example—moving the shopping container in the opposite direction.

vii. Generating a request aimed to another computerize device—such as the mobile phone of a user that movers the shopping container to perform a movement of the shopping container within the region so that at least one side camera will capture images, within the region, of another side of the region. For example—moving in the opposite direction.

viii. Generating a request aimed to another computerize device—such as to a portable computerized device associated with another shopping cart or to a computerized system in communication with other portable computerized device to perform a movement of another shopping container within the region.

ix. Request a transmission of one or more side images acquired within the region to another computerize device for further analysis of the content of the region.

x. Perform a content analysis, by a portable computerized device associated with the shopping container, of the content of the region.

xi. Responding to the content analysis—for example generating a region content change alert.

According to an embodiment, the responding may involve using at least one of the image processor 210, location unit 214, controller 220, communication unit 232, Man machine interface 234, or one or more memory/storage units 236.

According to an embodiment, the one or more memory and/or storage units 236 includes one or more memory unit, each memory unit may include one or more memory banks.

According to an embodiment, the one or more memory and/or storage units 236 includes a volatile memory and/or a non-volatile memory. The one or more memory and/or storage units 236 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory and/or storage units.

According to an embodiment, the at least one memory unit stores at least one database—such as any database known in the art—such as DB2®, Microsoft® Access, Microsoft® SQL Server, Oracle®, mySQL, PostgreSQL, and the like.

The memory and/or storage units 236 are configured to store firmware and/or software, one or more operating systems, data and metadata required to the execution of any of the methods mentioned in this application.

The memory and/or storage units 236 was shown as storing software. Any reference to software should be applied mutatis mutandis to code and/or firmware and/or instructions and/or commands, and the like.

Various units and/or components are in communication with each other using any communication elements and/or protocols.

The communication system 232 may be in communication with a bus. The bus represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 242 that is located outside the vehicle and is used for communication between the portable computerized device and other computerized systems. Logical connections between the processor and either one of remote computing systems can be made via a local area network (LAN) and a general wide area network (WAN). Such network connections can be through a network adapter (may belong to communication system 630) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 236 may be stored outside the vehicle. It should also be noted that the processor may evaluate signatures generated by a plurality of detectors.

According to an embodiment, the memory and/or storage units 236 stores at least one of: operating system 252, information 254, metadata 256, and software 258—all being used by the portable processing device for executing any method illustrated in this application.

Figure 7:
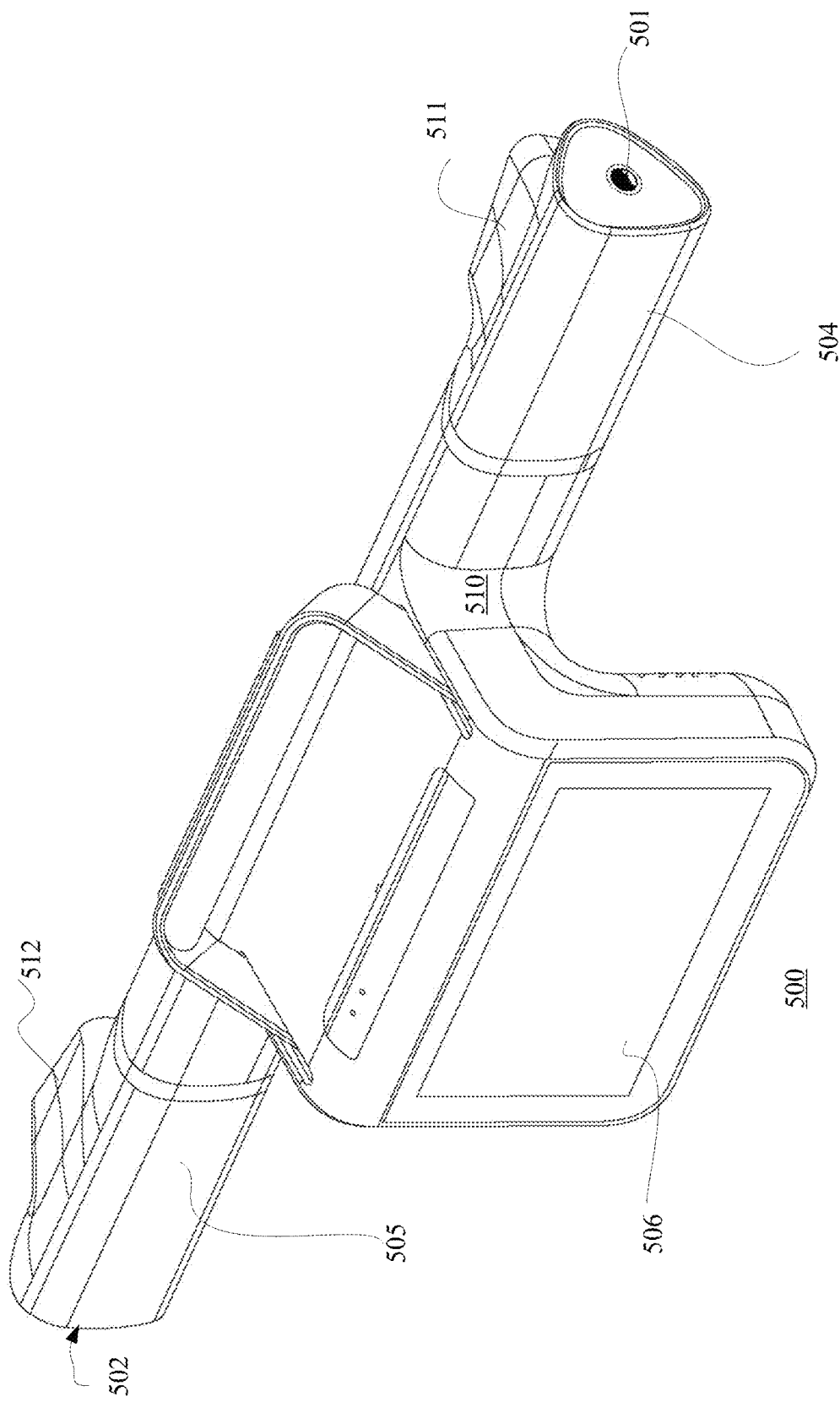
FIG. 7 illustrates an example of a portable computerized device.
Figure 8:
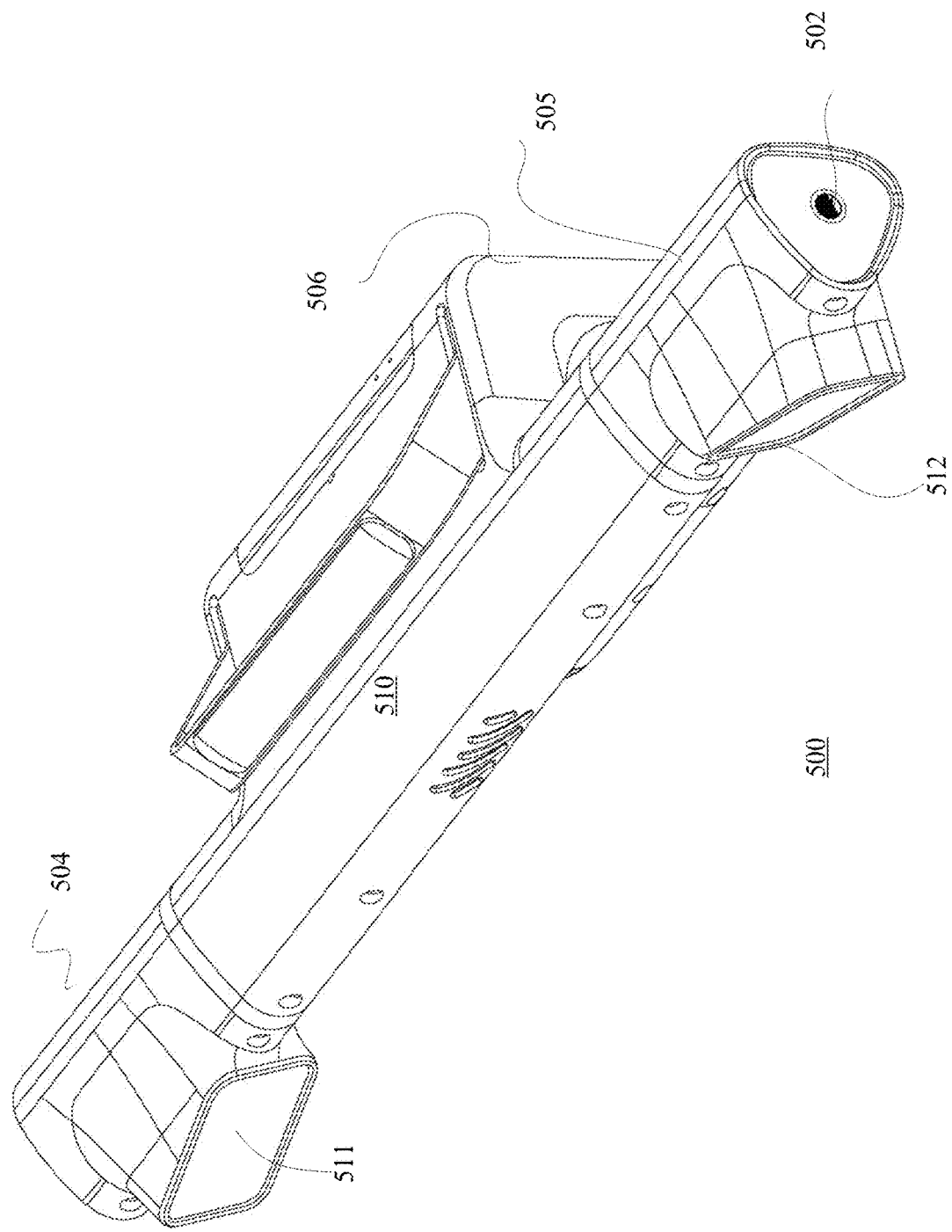
FIG. 8 illustrates an example of a portable computerized device

FIGS. 7 and 8 illustrate examples of a portable computerized device 500 including a body 510, a first side camera 501 and a second side camera 502 included within handles 504 and 505, display 506, and two cameras 511 and 512 configured to capture one or more images of an item being inserted to or removed from the shopping container.

The portable computerized device 500 may be detachably connected to the shopping container—in various manners—for example as illustrated in US patent application 2023/048635 titled "System and method for fast checkout using a detachable computerized device" which is incorporated herein by reference.

FIG. 9 illustrates an example of a an image 901 of shopping container 400, shelves and fields of view of the first side camera and of the second side camera. FIG. 9 also illustrates an example of a first side image 902 and a second side image.

According to an embodiment the side cameras have a fish-eye lens.

According to an embodiment the side camera includes a field of view that has a height that exceeds its height.

Figure 10:
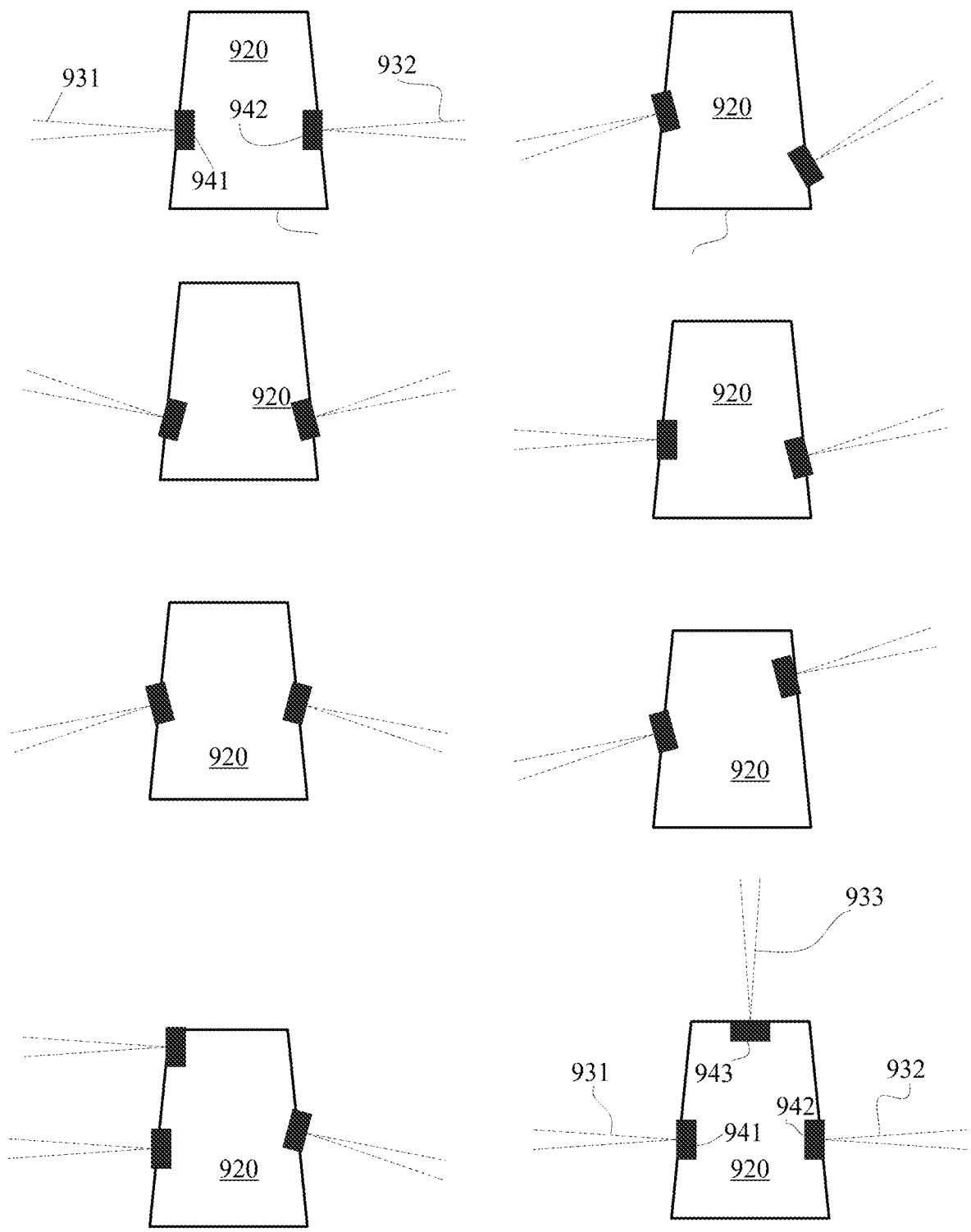
FIG. 10 illustrates examples of shopping containers and fields of views of cameras.

FIG. 10 illustrates examples of shopping containers 920 and fields of views 931, 932 and 933 of side cameras 941, 942 and 943.

It should be noted that the shopping container may be associated with any number of cameras and may be associated with one or more front cameras.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using microelectronics and/or optical components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and/or should be applied mutatis mutandis to a non-transitory computer readable medium storing instructions executed by a processor for performing the method.

Any reference in the specification to a system should be applied mutatis mutandis to a method that may be executed by the system and/or should be applied mutatis mutandis to a non-transitory computer readable medium storing instructions executed by the system.

Any reference in the specification to a non-transitory computer readable medium should be applied mutatis mutandis to a method that executed the instructions stored in the non-transitory computer readable medium and/or to a system configured to execute the instructions.

Any reference to a shopping container may be applied by any other movable device equipped with one or more side cameras that is within a building—for example—a cart, a hospital stretcher, and the like.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for determining a location of a shopping container within a store, the method comprises:
   - acquiring by a first side camera associated with the shopping container, a first side image of first content located to a first side of the shopping container; wherein the first side camera has a first side camera field of view that is directed solely to content located to the first side of the shopping container;
   - acquiring by a second side camera associated with the shopping container, a second side image of second content located to a second side of the shopping container; wherein the second side camera has a second side camera field of view that is directed solely to content located to the second side of the shopping container; wherein the first side differs from the second side; wherein each one of the first side and the second side differ from a front of the shopping container and differs from a rear of the shopping container;
   - determining a pose of the first side camera, based on the first side image and by a machine learning process trained using a structure from motion model of the store, wherein the structure from motion model is generated from untagged side images acquired by side cameras of shopping containers that moved within the store during an image acquisition process, wherein the untagged side images are associated with side cameras pose information learnt during the generation of the structure from motion model;
   - determining a pose of the second side camera, based on the second side image and by the machine learning process trained using the structure from motion model of the store;
   - determining the location of the shopping container based on the pose of the first camera and on the pose of the second camera;
   - determining a location determination confidence level;
   - determining a location error when there is a mismatch that exceeds a threshold between a location estimate based on the pose of the first camera and a location estimate based on the pose of the second camera; and
   - capturing by a camera that differs from the first side camera and from the second side camera, one or more images of an item being inserted or removed from the shopping container.

2. The method according to claim 1, wherein the determining of the location of the shopping container is also responsive to previous location estimates generated based on a pose of at least one of the side cameras.

3. The method according to claim 1, comprising training the machine learning process trained using the structure from motion model of the store, and generating the structure from motion model from the untagged side images acquired by the side cameras of the shopping containers that moved within the store during the image acquisition process.

4. The method according to claim 1, comprising triggering an update of the structure from motion model based on location estimate errors associated with a region of the structure from motion model.

5. The method according to claim 1, wherein the determining of the location of the shopping container is also responsive to inputs from a simultaneous localization and mapping process.

6. The method according to claim 1, further comprising using the location of the shopping container as an anchor for a location estimate generated by a simultaneous localization and mapping process.

7. The method according to claim 1, comprising determining the location of the shopping container also based on non-visual sensor information.

8. The method according to claim 7, comprising training the machine learning process using non-visual sensor information obtained in relation to the shopping containers that moved within the store during the image acquisition process.

9. A non-transitory computer readable medium for determining a location of a shopping container within a store, the non-transitory computer readable medium comprises:
   - acquiring by a first side camera associated with the shopping container, a side first side image of first content located to a first side of the shopping container; wherein the first side camera has a first side camera field of view that is directed solely to content located to the first side of the shopping container;
   - acquiring by a second side camera associated with the shopping container, a second side image of second content located to a second side of the shopping container; wherein the second side camera has a second side camera field of view that is directed solely to content located to the second side of the shopping container; wherein the first side differs from the second side; wherein each one of the first side and the second side differ from a front of the shopping container and differs from a rear of the shopping container;
   - determining a pose of the first side camera, based on the first side image and by a machine learning process trained using a structure from motion model of the store, wherein the structure from motion model is generated from untagged side images acquired by side cameras of shopping containers that moved within the store during an image acquisition process, wherein the untagged side images are associated with side cameras pose information learnt during the generation of the structure from motion model;
   - determining a pose of the second side camera, based on the second side image and by the machine learning process trained using the structure from motion model of the store;
   - determining the location of the shopping container based on the pose of the first camera and on the pose of the second camera;
   - determining a location determination confidence level;
   - determining a location error when there is a mismatch that exceeds a threshold between a location estimate based on the pose of the first camera and a location estimate based on the pose of the second camera; and
   - processing one or more images of an item being inserted to or removed from the shopping cart, the one or more images of the item being captured by a camera that differs from the first side camera and from the second side camera.

10. The non-transitory computer readable medium according to claim 9, wherein the determining of the location of the shopping container is also responsive to previous location estimates generated based on a pose of at least one of the side cameras.

11. The non-transitory computer readable medium according to claim 9, wherein the determining of the location of the shopping container is also responsive to predicted locations of the shopping container.

12. The non-transitory computer readable medium according to claim 9, that stores instructions for training the machine learning process using a loss function applied on location estimates provided based on first side images and on location estimated based on second side images.

13. The non-transitory computer readable medium according to claim 9, that stores instructions executable by a processor for triggering an update of the structure from motion model based on location estimate errors associated with a region of the structure from motion model.

14. The non-transitory computer readable medium according to claim 9, wherein the determining of the location of the shopping container is also responsive to inputs from a simultaneous localization and mapping process.

15. The non-transitory computer readable medium according to claim 9, further that stores instructions executable by a processor for using the location of the shopping container as an anchor for a location estimate generated by a simultaneous localization and mapping process.

16. A portable computerized device configured for tracking items in a shopping container; the portable computerized device comprising:
   a camera configured to capture one or more images of an item being inserted to or removed from the shopping container;
      a first side camera configured to acquire a side first side image of first content located to a first side of the shopping container; wherein the first side camera has a first side camera field of view that is directed solely to content located to the first side of the shopping container;
      an image processor configured to determine a pose of the first side camera, based on the first side image and by a machine learning process trained using a structure from motion model of the store, wherein the structure from motion model is generated from untagged side images acquired by side cameras of shopping containers that moved within the store during an image acquisition process, wherein the untagged side images are associated with side cameras pose information learnt during the generation of the structure from motion model;
      a second side camera configured to acquire a second side image of second content located to a second side of the portable computerized device; wherein the second side camera has a second side camera field of view that captures content located solely at the second side of the shopping container; wherein the first side differs from the second side; wherein each one of the first side and the second side differ from a front of the shopping container and differs from a rear of the shopping container;
      wherein the image processor is further configured to determine a pose of the second side camera, based on the second side image and by the machine learning process trained using the structure from motion model of the store; and
   a location unit configured to:
      determine the location of the shopping container based on the pose of the first camera and based on the pose of the second camera;
      determine a location determination confidence level; and
      determine a location error when there is a mismatch that exceeds a threshold between a location estimate based on the pose of the first camera and a location estimate based on the pose of the second camera.

17. The portable computerized device according to claim 16, wherein the first side is opposite to the second side.

18. The portable computerized device according to claim 16, wherein the location unit is configured to determine the location also based on previous location estimates generated based on a pose of at least one of the side cameras.

19. The portable computerized device according to claim 16, wherein the location unit is configured to determine the location also based toon predicted locations of the portable computerized device.

20. The portable computerized device according to claim 16, further configured to trigger an update of the structure from motion model based on location estimate errors associated with a region of the structure from motion model.

21. The portable computerized device according to claim 16, wherein the location unit is configured to determine the location also based on inputs from a simultaneous localization and mapping process.

22. The portable computerized device according to claim 16, wherein the location unit is configured to use the location of the shopping container as an anchor for a location estimate generated by a simultaneous localization and mapping process.

23. The portable computerized device according to claim 16, wherein the location unit is configured to determine the location also based on non-visual sensor information.

* * * * *